United States Patent Office 3,577,233
Patented May 4, 1971

3,577,233
HIGH TEMPERATURE BRAZING ALLOYS
Nicholas T. Gamer, Palo Alto, Calif., assignor to
Western Gold & Platinum Company
No Drawing. Filed Sept. 10, 1968, Ser. No. 758,705
Int. Cl. C22c 5/00
U.S. Cl. 75—134                                     11 Claims

ABSTRACT OF THE DISCLOSURE

Brazing alloys comprising in percent by weight 25–70% gold, 5–30% palladium, 15–40% nickel, 4–12% chromium and .01 to 2% yttrium. These alloys exhibit substantial ductility and high oxidation and corrosion resistance at service temperatures of 1600–1800° F. and above continuously for 100 hours or more and therefore having particular utility in joining stainless steel and superalloys in aircraft and space craft engines and components. The addition of up to about 2% by weight of tungsten, tantalum or molybdenum to these alloys further improves their high temperature strength.

BACKGROUND OF THE INVENTION

This invention relates to brazing alloys and more particularly to an improved alloy for joining superalloys designed for sustained service at temperatures of 1600–1800° F. and above.

As temperature-resistant and corrosion-resistant characteristics of superalloys are improved to meet ever increasing demands of modern technology, there is an accompanying requirement for brazing alloys with similar characteristics to join such elements. Jet engines for high speed aircraft and other space vehicles, for example, have turbine buckets, blades and nozzles which are operated continuously for long periods at temperatures of 1600–1800° F. and above. Under such operating conditions, brazing compositions used to join these engine parts oxidize rapidly and lose their strength. The corrosive by-products of combustible engine gases, such as sulfur compounds, tend to penetrate the brazing material and further contribute to the rapid deterioration of the brazed joints. Such brazing alloys must also be sufficiently ductile to withstand conditions of high localized stress.

An object of this invention is the provision of an improved brazing alloy which maintains high tensile strength and hot corrosion resistance at elevated temperatures, i.e., 1600–1800° F. for 100 hours or more.

SUMMARY OF THE INVENTION

The utility of gold-palladium-nickel-chromium brazing alloys in highly corrosive oxidizing atmospheres at high temperatures is greatly improved by the addition of yttrium. This element produces a superficial coating on the alloy which resists penetration of oxygen and nitrogen at high temperatures and thus preserves the strength and ductility of joints made with the alloy. Yttrium also improves the grain refinement within the alloy structure and prevents grain growth at high temperatures. This improves the strength of the brazed joints at these elevated temperatures.

DESCRIPTION OF PREFERRED EMBODIMENT

In the fabrication of high performance jet engines and more particularly in the joining of stainless steel and superalloys to make hot gas turbine parts and similar assemblies, brazing alloys having specific compositions given in Table 1 produced excellent bonds. These alloys exhibited good oxidation and corrosion resistance at temperatures of 1600–1800° F. and had excellent stress rupture characteristics. There was no significant intermetallic reaction of the brazing alloy with the base metal which therefore retained its original physical properties at or near the braze.

TABLE 1

| Alloy No. | Composition, weight percent | | | | | | |
|---|---|---|---|---|---|---|---|
| | Gold | Palladium | Nickel | Chromium | Yttrium | Molybdenum | Tantalum |
| 1 | 29–30 | 25–27 | 37–38 | 6–8 | .01 to 2 | | |
| 2 | 45–47 | 22–24 | 22–24 | 6–7 | .01 to 2 | | |
| 3 | 65–67 | 7–8 | 19–22 | 5–7 | .01 to 2 | | |
| 4 | 41–43 | 17–19 | 31–33 | 6–7 | .01 to 2 | 1 | |
| 5 | 32–34 | 26–28 | 28–30 | 8–10 | .01 to 2 | | 1 |

A preferred method of making the brazing alloys listed in Table 1 consists of melting essentially pure gold, palladium and nickel in the prescribed weight ratio in a vacuum furnace and raising the temperature to approximately 100° C. above the melting point of the mixture. Charges of chromium and, if required, tantalum or molybdenum are then added, followed by the desired amount of yttrium. It is important that the yttrium element be added last. Thereafter the melt is stirred and cast into an ingot which is then formed into sheet or wire.

The addition of 0.5%–2.0% by weight of yttrium to the melt does not necessarily mean that this element will remain in the brazing alloy in this proportion. Yttrium reacts with gases present in the melt and with the furnace atmosphere and consequently its content tends to be lower than the initial proportion. The precise amount of yttrium in the alloy is dependent on a number of factors including cleanliness of the entire system. However, the following conclusions are made from analysis of test results of alloys embodying this invention:

(1) There is difficulty in rolling (cold working) the alloy if the yttrium content exceeds 0.5%.

(2) The addition of 1% by weight of yttrium to the melt yields an alloy having yttrium present in a ratio of 0.2–0.5% by weight.

(3) The oxidation resistance of alloys having 0.1% and 0.5% yttrium, respectively, is about the same. The lower limit of yttrium content for good oxidation resistance was believed to be about 0.1%.

The alloys of Table 1 are applied to the base parts to be joined as wire or strips in a conventional manner or may be formed into a flexible strip as described in Patent No. 3,056,195 to facilitate proper positioning on complexly shaped articles. Brazing preferably is accomplished in a highly reducing atmosphere such as in a dry hydrogen furnace or in a vacuum.

A specific example of the advantage of these improved brazing alloys will now be described with respect to Alloy No. 2 composed essentially of 46.5% Au, 23.5% Pd, 23.4% Ni, 6.5% Cr and 0.1% Y. A T-joint was made with blocks of a base metal consisting of Hastelloy X having a composition in percent by weight of 22% Cr, 9% Mo, 1% Co, 18.5% Fe and the balance Ni. The blocks and properly positioned brazing alloy were placed in a vacuum furnace at $1.5 \times 10^{-5}$ mm. Hg and the temperature was raised until the braze flowed at 2076° F. Thereafter the joint was cooled. The brazed assembly was then heated in an oxidizing atmosphere to 1800° F. for 400 hours. Thereafter a Knoop hardness test was conducted on a section of the joint across the fillet and base metal with the following results:

TABLE 2

| | Knoop hardness number | |
|---|---|---|
| | Hastelloy X | Fillet |
| Before oxidation | 258 | 310 |
| After oxidation | 333 | 268 |

Metallographic examination of the fillet indicated no apparent oxidation penetration.

Measurement was made of weight gain and flaking of the sample caused by this oxidation test and a comparison was made with a reference brazing alloy having substantially the same composition as Alloy No. 2 but with no yttrium. The results were:

TABLE 3

|  | Alloy | | |
| --- | --- | --- | --- |
|  | 1 | 2 | Reference |
| Weight gain, mg./cm.² | 4.65 | 5.16 | 37.7 |
| Flaking | None | None | Heavy |

The reference braze not only failed this oxidation test but did so catastrophically, thereby demonstrating the high performance of the brazing alloys embodying the invention under extremely severe conditions. It is noted that the oxidation resistances of Alloy Nos. 1 and 2 are about the same but due to higher gold content, Alloy No. 2 had greater high-temperature strength and creep characteristics than Alloy No. 1.

In a test to measure corrosion resistance, T-shaped specimens of a base metal consisting of 0.1% by weight carbon, 1.5% manganese, 0.5% silicon, 20% chromium, 10% nickel, 15% tungsten, and the balance cobalt were brazed with Alloy No. 3 and were exposed to sulfur dioxide ($SO_2$) with 1 p.p.m. salt in a furnace at 1900° F. for 16 hours. This sulfur concentration is about 100 times greater than that experienced in the combustion chambers of jet engines. Microanalysis of these specimens indicated that the sulfidation, i.e., sulfur penetration of the brazing alloy was generally less than but never greater than such penetration of the base metal.

All of the alloys listed in Table 1 have been tested and utilized in a manner similar to that described above. Similar improvements and advantages were identified in the utilization of these alloys.

It is within the scope of the invention that the gold content of the alloy be in the range of 25–70%, the palladium content from 5 to 30%, the nickel content from 15 to 40%, chromium from 4 to 12%, and .01 to 2% yttrium. The invention also contemplates the addition to these alloys of up to about 2% by weight of a refractory metal selected from the group consisting of tungsten, tantalum and molybdenum. The preferred compositions among those described in Table 1 are Alloy Nos. 1, 2 and 3 with the yttrium content in each of 0.1% to 0.5%.

What is claimed is:
1. An alloy for brazing consisting essentially of 29 to 67% gold, 7 to 28% palladium, 19 to 38% nickel, 5 to 10% chromium, .01 to 2% yttrium, and up to 2% of the metal selected from the group consisting tungsten, tantalum and molybdenum.
2. An alloy for brazing consisting essentially of 29 to 67% gold, 7 to 28% palladium, 19 to 38% nickel, 5 to 10% chromium, and 0.1 to 2% yttrium.
3. An alloy for brazing consisting essentially of 29 to 30% gold, 25 to 27% palladium, 37 to 38% nickel, 6 to 8% chromium, and .01 to 2% yttrium.
4. An alloy for brazing consisting essentially of 45 to 47% gold, 22 to 24% palladium, 22 to 24% nickel, 6 to 7% chromium, and .01 to 2% yttrium.
5. An alloy for brazing consisting essentially of 65 to 67% gold, 7 to 8% palladium, 19 to 22% nickel, 5 to 7% chromium, and .01 to 2% yttrium.
6. An alloy for brazing consisting essentially of 41 to 43% gold, 17 to 19% palladium, 31 to 33% nickel, 6 to 7% chromium, .01 to 2% yttrium, and about 1% molybdenum.
7. An alloy for brazing consisting essentially of 32 to 34% gold, 26 to 28% palladium, 28 to 30% nickel, 8 to 10% chromium, .01 to 2% yttrium, and about 1% tantalum.
8. An alloy for brazing consisting essentially of 29 to 30% gold, 25 to 27% palladium, 37 to 38% nickel, 6 to 8% chromium and 0.1 to 0.5% yttrium.
9. An alloy for brazing consisting essentially of 45 to 47% gold, 22 to 24% palladium, 22 to 24% nickel, 6 to 7% chromium, and 0.1 to 0.5% yttrium.
10. An alloy for brazing consisting essentially of 65 to 67% gold, 7 to 8% palladium, 19 to 22% nickel, 5 to 7% chromium, and 0.1 to 0.5% yttrium.
11. An alloy for brazing consisting essentially of 25 to 70% gold, 5 to 30% palladium, 15 to 40% nickel, 4 to 12% chromium, and .01 to 2% yttrium.

References Cited

UNITED STATES PATENTS 3,148,053    9/1964    Spaletta _____ 75—134

L. DEWAYNE RUTLEDGE, Primary Examiner

E. L. WEISE, Assistant Examiner

U.S. Cl. X.R.

75—165, 172

PO-1050
(5/69)

UNITED STATES PATENT OFFICE
CERTIFICATE OF CORRECTION

Patent No. 3,577,233             Dated May 4, 1971

Inventor(s)        Nicholas T. Gamer

It is certified that error appears in the above-identified patent and that said Letters Patent are hereby corrected as shown below:

In the specification, column 2, line 41, delete "0.1%" and substitute therefor --.01%--.

Column 4, claim 2, last line, delete "0.1%" and substitute therefor --.01%--.

Signed and sealed this 3rd day of August 1971.

(SEAL)
Attest:

EDWARD M. FLETCHER, JR.           WILLIAM E. SCHUYLER, JR.
Attesting Officer                   Commissioner of Patents